United States Patent
Stafford, Jr. et al.

(10) Patent No.: US 11,798,027 B1
(45) Date of Patent: *Oct. 24, 2023

(54) METHODS AND SYSTEMS FOR DETECTING FRAUDULENT ADVERTISEMENTS IN PAY-PER-CALL ADVERTISING

(71) Applicant: FRAUD MONITOR, LLC, Cheyenne, WY (US)

(72) Inventors: David E. Stafford, Jr., Gilbert, AZ (US); Kai Rossbach, El Dorado Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/914,050

(22) Filed: Jun. 26, 2020

Related U.S. Application Data

(63) Continuation of application No. 16/224,207, filed on Dec. 18, 2018, now Pat. No. 10,776,819, which is a continuation of application No. 13/967,618, filed on Aug. 15, 2013, now Pat. No. 10,600,081.

(51) Int. Cl.
| | |
|---|---|
| *G06Q 30/02* | (2023.01) |
| *G06Q 30/0241* | (2023.01) |
| *G06Q 30/0251* | (2023.01) |

(52) U.S. Cl.
CPC .............. *G06Q 30/0248* (2013.01); *G06Q 30/0251* (2013.01)

(58) Field of Classification Search
CPC ................. G06Q 30/0248; G06Q 30/0251
See application file for complete search history.

(56) References Cited

U.S. PATENT DOCUMENTS

| | | | |
|---|---|---|---|
| 2007/0033103 A1 | 2/2007 | Collins et al. | |
| 2007/0179849 A1 | 8/2007 | Jain | |
| 2007/0250390 A1 | 10/2007 | Lee et al. | |
| 2008/0080691 A1* | 4/2008 | Dolan et al. | H04L 65/1079 379/201.01 |
| 2011/0231247 A1* | 9/2011 | Srinivasan et al. | H04L 67/535 379/212.01 |
| 2016/0043867 A1* | 2/2016 | Bonsignore | H04L 63/0442 713/168 |

OTHER PUBLICATIONS

J. Goodman. Pay-Per-Percentage Impressions: An Advertising Method that is Highly Robust to Fraud. ACM E-Commerce '05, Workshop on Sponsored Search Auctions, Jun. 5, 2005, Vancouver, BC. (Year: 2005).*

* cited by examiner

*Primary Examiner* — Waseem Ashraf
*Assistant Examiner* — Christopher C Busch
(74) *Attorney, Agent, or Firm* — Michael W. Goltry; Robert A. Parsons; Parsons & Goltry, PLLC

(57) ABSTRACT

A method includes monitoring electronic network advertisements for policed advertising content via a fraud monitor, retrieving a pay-per-call advertisement of an advertiser via the fraud monitor based on the monitoring, analyzing the pay-per-call advertisement via the fraud monitor to confirm it as a suspect pay-per-call advertisement, establishing a fraud-detection telephone call via an advertisement telephone number of the suspect pay-per-call advertisement from a control telephone number of the fraud monitor and in response thereto connecting the fraud-detection telephone call to a target telephone number of the advertiser via a connection provider, and tracking and storing fraud-detection telephone call information, including the advertisement telephone number, the control telephone number, a publisher reference associated with the suspect pay-per-call advertisement, and the target telephone number, via the fraud monitor, of a telephone connection between the control telephone number and the target telephone number.

5 Claims, 8 Drawing Sheets

CALL REPORT

| Advertiser | Pub. ID | Affiliate | Campaign | Media | $ Earned | $ Comm. | $ Margin | $ Fees | Ad. Number |
|---|---|---|---|---|---|---|---|---|---|
| Allstate | rr_0131484236 | SQI | Bundled-Spanish | Call Promotion | | | | | 777-777-7777 |

142 — 144 — 150 — 152 — 154 — 156 — 146

| Target Number | Duration | Flag | Policed Content | Control Number |
|---|---|---|---|---|
| 555-555-5555 | 0:00:52 | 9999 | 1234 | 888-888-8888 |

From: Monitor
To: Manager
cc:
Subject: Fraudulent Advertisement Email Alert

Attachments: Screen Scrape; Call Information

Dear Sir:

We inform you that we have discovered a potentially fraudulent advertisement. As evidence of this, we attach a screen scrap of the suspect advertisement and call information related to the suspect advertisement. Please contact us at 999-999-9999 if we can be of any further assistance.

Sincerely,

Your Team at Fraud Monitor

FIG. 7

METHODS AND SYSTEMS FOR DETECTING FRAUDULENT ADVERTISEMENTS IN PAY-PER-CALL ADVERTISING

FIELD OF THE INVENTION

The present invention relates to telephonic connections, advertising, and advertisement monitoring, including in mobile and wireless applications, for fraud detection purposes.

BACKGROUND OF THE INVENTION

Paid calling advertising, which is also referred to as pay-per-call advertising or cost-per-call advertising, is a system of advertising that allows advertisers to generate, track, and compensate pay-per-call providers and publishers for leads received through phone calls. In pay-per-call advertising the advertiser pays a fee for each call connecting the consumer to the advertiser. Click-to-call is a form of paid calling advertising in which a person clicks an object, such as a button, image, advertisement, or text, to initiate a telephone call. Click-to-call requests are most commonly made on websites but can also be initiated by hyperlinks placed in email, blogs, flash animations or video, and other Internet-based objects or user interfaces. Click-to-call functionality is now extended to web-enabled mobile phones enabling a user to connect by clicking the phone number link, without having to dial the number manually. Web-enabled mobile phones and their inherent click-to-call and search functionality are also contributing to the substantial growth of the pay-per-call model.

Advertisers employ pay-per-call providers or networks in pay-per-call advertising to drive calls via advertisements to their company representatives, or to their interactive voice response (IVR) systems. Pay-per-call providers work with advertisers to create advertisements for products and/or services, which the pay-per-call providers publish directly, or distribute to publishers that publish the advertisements via pay-per-call campaigns. The use of publishers is beneficial and commonplace because it provides widespread advertisement distribution.

Pay-per-call providers have hundreds and in some cases thousands of publishers with web content they want to monetize. As a result, pay-per-call providers are hubs for advertisers. In pay-per-call campaigns, publishers select advertisement phone numbers and place advertisements on behalf of pay-per-call providers that consumers see, such as on their mobile phones. When a consumer places a call, such as by "clicking" on the advertisement, a phone call is generated, such as from a mobile phone, to the advertisement phone number, and the consumer is then transferred via call forwarding a target phone number of the advertiser. Calls can be automatically forwarded to the advertisers or sent to a call center where potential prospects are qualified before being passed along to advertisers. Call tracking, a key part of the technology that enables the pay-per-call model, is the ability to track calls to allow pay-per-call providers to account for results, and to reward publishers for performance, on a revenue-share basis.

In pay-per-call advertising, advertisers normally do not want to compete with publishers for traffic generated with their brands or trademarks, and do not want traffic generated by the use of other companies' brands or trademarks because to do so causes customer confusion and trademark infringement issues. Furthermore, many advertisers employ pay-per-call networks to publish generic or non-branded advertisements to attract consumers that do not respond well to brand advertising. As a result, advertisers typically approve advertisements and their scope of distribution prior to advertisement publication to ensure the advertisements are compliant and meet their strict requirements.

Publishers generate their revenue through call generation via advertisements they publish through pay-per-call campaigns. As a result, some publishers, which are often referred to as rogue publishers, and even some unscrupulous advertisers, employ dishonest techniques to generate "click-through" calls in order to increase revenue. A "click-through" call is a call generated from an advertisement that goes to a different advertiser from the one the calling party intended to call. To generate a "click-through" call, a rogue publisher or dishonest advertiser will incorporate into an advertisement misleading advertising content designed to mislead a consumer into thinking that the advertisement relates to particular advertiser. However, when a call is made from such an advertisement, the call goes not to the advertiser the caller believed he/she was calling but to a different advertiser, which generates dishonestly-obtained revenue for the rogue publisher provides the advertiser the calling party reaches with the opportunity to harvest business away from the advertiser the calling party thought he/she was calling. There are several monitoring services that monitor and police trademark, keyword, and key phrase compliance of advertisements on the web based on criteria specified by advertisers. The monitoring service monitors advertisements found on designated search engines, and alerts advertisers of potentially trademark infringing or non-compliant advertisements. Although the major search engine outlets have rules against using trademarked terms illegally, enforcement is difficult and any trademark compliance monitoring and compliance enforcement is left to the advertisers or the pay-per-call providers. Although it a common and relatively simple process of monitoring trademark, keyword, and key phrase compliance in advertisements, there is a need in the art for a way to monitor advertisement compliance using the phone numbers listed in the advertisements to allow advertisers and pay-per-call providers to quickly isolate fraudulent or non-compliant advertisements, identify the publishers and advertisers of such fraudulent or non-compliant advertisements, and to take the necessary action to facilitate the removal or discontinuance of such fraudulent or non-compliant advertisements.

SUMMARY OF THE INVENTION

In an advertisement in an electronic network, including an advertisement telephone number of a connection provider assigned to an advertiser of the advertisement, policed advertising content, and a publisher reference, published to a communications device via a publisher, to receive a telephone call at the connection provider via the advertisement telephone number, and the advertisement telephone number to replace a target telephone number of the advertiser within the advertisement, a method includes monitoring advertisements in the electronic network via a fraud monitor for the policed advertising content, retrieving the advertisement via the fraud monitor based on the policed advertising content monitoring, comparing the publisher reference of the advertisement to one or more valid publisher references authorized to use the policed advertising content of the advertisement by matching against the one or more valid publisher references via the fraud monitor, establishing a fraud-detection telephone call to the advertisement telephone number from a control telephone number via the fraud monitor when the publisher reference does not match any of the one or more valid publisher references, in response to the fraud-detection telephone call from the control telephone number to the advertisement telephone number, forwarding the fraud-detection telephone call to the target telephone number of the advertiser via the connection provider to establish a telephone connection between the control telephone number and the target telephone number, and tracking and storing fraud-detection telephone call information, including the advertisement telephone number, the control telephone number, the publisher reference, and the target telephone number, via a calling identification reporting system of the fraud monitor, of the telephone connection between the control telephone number and the target telephone number established via the fraud-detection call from the control telephone number of the fraud monitor to the advertisement telephone number included in the advertisement. In one embodiment, the method further includes entering a predetermined fraud-detection key press code via the fraud monitor during the fraud-detection telephone call to be included in the fraud-detection telephone call information, the fraud-detection key press code indicating a possible advertisement content violation. In another embodiment, the method further includes entering a predetermined policed advertising content identification key press code via the fraud monitor during the fraud-detection telephone call to be included in the fraud-detection telephone call information, the policed advertising content identification key press code identifying the policed advertising content of the policed advertising content monitoring. In yet another embodiment, the method further includes taking and storing a screen scrape of the advertisement via the fraud monitor. In still another embodiment, the method further includes compiling and sending an electronic message, including the screen scrape, the fraud-detection telephone call information, and a predetermined message identifying the screen scrape and the fraud-detection telephone call information as evidence of a possible fraudulent advertisement, via the fraud monitor to a predetermined recipient reference. The policed advertising content is misleading content, such as at least one of a brand, a trademark, a representation, and a guarantee.

In an advertisement in an electronic network, including an advertisement telephone number of a connection provider assigned to an advertiser of the advertisement, policed advertising content, and a publisher reference, published to a communications device via a publisher, to receive a telephone call at the connection provider via the advertisement telephone number, and the advertisement telephone number to replace a target telephone number of the advertiser within the advertisement, a machine-readable medium having stored thereon a set of instructions which, when executed, perform a method that includes monitoring advertisements in the electronic network via a fraud monitor for the policed advertising content, retrieving the advertisement via the fraud monitor based on the policed advertising content monitoring, comparing the publisher reference of the advertisement to one or more valid publisher references authorized to use the policed advertising content of the advertisement by matching against the one or more valid publisher references via the fraud monitor, establishing a fraud-detection telephone call to the advertisement telephone number from a control telephone number via the fraud monitor when the publisher reference does not match any of the one or more valid publisher references, in response to the fraud-detection telephone call from the control telephone number to the advertisement telephone number, forwarding the fraud-detection telephone call to the target telephone number of the advertiser via the connection provider to establish a telephone connection between the control telephone number and the target telephone number, and tracking and storing fraud-detection telephone call information, including the advertisement telephone number, the control telephone number, the publisher reference, and the target telephone number, via a calling identification reporting system of the fraud monitor, of the telephone connection between the control telephone number and the target telephone number established via the fraud-detection call from the control telephone number of the fraud monitor to the advertisement telephone number included in the advertisement. In one embodiment, the method further includes entering a predetermined fraud-detection key press code via the fraud monitor during the fraud-detection telephone call to be included in the fraud-detection telephone call information, the fraud-detection key press code indicating a possible advertisement content violation. In another embodiment, the method further includes entering a predetermined policed advertising content identification key press code via the fraud monitor during the fraud-detection telephone call to be included in the fraud-detection telephone call information, the policed advertising content identification key press code identifying the policed advertising content of the policed advertising content monitoring. In yet another embodiment, the method further includes taking and storing a screen scrape of the advertisement via the fraud monitor. In still another embodiment, the method further includes compiling and sending an electronic message, including the screen scrape, the fraud-detection telephone call information, and a predetermined message identifying the screen scrape and the fraud-detection telephone call information as evidence of a possible fraudulent advertisement, via the fraud monitor to a predetermined recipient reference. The policed advertising content is misleading content, such as at least one of a brand, a trademark, a representation, and a guarantee.

In an advertisement in an electronic network, including an advertisement telephone number of a connection provider assigned to an advertiser of the advertisement, policed advertising content, and a publisher reference, published to a communications device via a publisher, to receive a telephone call at the connection provider via the advertisement telephone number, and the advertisement telephone number to replace a target telephone number of the advertiser within the advertisement, a system includes means for monitoring advertisements in the electronic network via a fraud monitor for the policed advertising content, means for retrieving the advertisement via the fraud monitor based on the policed advertising content monitoring, means for comparing the publisher reference of the advertisement to one or more valid publisher references authorized to use the policed advertising content of the advertisement by matching against the one or more valid publisher references via the fraud monitor, means for establishing a fraud-detection telephone call to the advertisement telephone number from a control telephone number via the fraud monitor when the publisher reference does not match any of the one or more valid publisher references, which causes the connection provider to forward the fraud-detection telephone call to the target telephone number of the advertiser to establish a telephone connection between the control telephone number and the target telephone number, and means for tracking and storing fraud-detection telephone call information, including the advertisement telephone number, the control telephone number, the publisher reference, and the target telephone number, via a calling identification reporting system of the fraud monitor, of the telephone connection between the control telephone number and the target telephone number established via the fraud-detection call from the control telephone number of the fraud monitor to the advertisement telephone number included in the advertisement. In one embodiment, the system further includes means for entering a predetermined fraud-detection key press code via the fraud monitor during the fraud-detection telephone call to be included in the fraud-detection telephone call information, the fraud-detection key press code indicating a possible advertisement content violation. In another embodiment, the system further includes means for entering a predetermined policed advertising content identification key press code via the fraud monitor during the fraud-detection telephone call to be included in the fraud-detection telephone call information, the policed advertising content identification key press code identifying the policed advertising content of the policed advertising content monitoring. In yet another embodiment, the system further includes means for taking and storing a screen scrape of the advertisement via the fraud monitor. In still another embodiment, the system further includes means for compiling and sending an electronic message, including the screen scrape, the fraud-detection telephone call information, and a predetermined message identifying the screen scrape and the fraud-detection telephone call information as evidence of a possible fraudulent advertisement, via the fraud monitor to a predetermined recipient reference.

In an advertisement in an electronic network, including an advertisement telephone number of a connection provider assigned to an advertiser of the advertisement, policed advertising content, and a publisher reference, published to a communications device via a publisher, to receive a telephone call at the connection provider via the advertisement telephone number, and the advertisement telephone number to replace a target telephone number of the advertiser within the advertisement, a method includes monitoring advertisements in the electronic network via a fraud monitor for the policed advertising content, retrieving the advertisement via the fraud monitor based on the policed advertising content monitoring, establishing a fraud-detection telephone call to the advertisement telephone number from a control telephone number via the fraud monitor, in response to the fraud-detection telephone call from the control telephone number to the advertisement telephone number, forwarding the fraud-detection telephone call to the target telephone number of the advertiser via the connection provider to establish a telephone connection between the control telephone number and the target telephone number, and tracking and storing fraud-detection telephone call information, including the advertisement telephone number, the control telephone number, the publisher reference, and the target telephone number, via a calling identification reporting system of the fraud monitor, of the telephone connection between the control telephone number and the target telephone number established via the fraud-detection call from the control telephone number of the fraud monitor to the advertisement telephone number included in the advertisement. In one embodiment, the method further includes entering a predetermined fraud-detection key press code via the fraud monitor during the fraud-detection telephone call to be included in the fraud-detection telephone call information, the fraud-detection key press code indicating a possible advertisement content violation. In another embodiment, the method further includes entering a predetermined policed advertising content identification key press code via the fraud monitor during the fraud-detection telephone call to be included in the fraud-detection telephone call information, the policed advertising content identification key press code identifying the policed advertising content of the policed advertising content monitoring. In yet another embodiment, the method further includes taking and storing a screen scrape of the advertisement via the fraud monitor. In still another embodiment, the method further 23 includes compiling and sending an electronic message, including the screen scrape, the fraud-detection telephone call information, and a predetermined message identifying the screen scrape and the fraud-detection telephone call information as evidence of a possible fraudulent advertisement, via the fraud monitor to a predetermined recipient reference. The policed advertising content is misleading content, such as at least one of a brand, a trademark, a representation, and a guarantee.

In an advertisement in an electronic network, including an advertisement telephone number of a connection provider assigned to an advertiser of the advertisement, policed advertising content, and a publisher reference, published to a communications device via a publisher, to receive a telephone call at the connection provider via the advertisement telephone number, and the advertisement telephone number to replace a target telephone number of the advertiser within the advertisement, a machine-readable medium having stored thereon a set of instructions which, when executed, perform a method that includes monitoring advertisements in the electronic network via a fraud monitor for the policed advertising content, retrieving the advertisement via the fraud monitor based on the policed advertising content monitoring, establishing a fraud-detection telephone call to the advertisement telephone number from a control telephone number via the fraud monitor, in response to the fraud-detection telephone call from the control telephone number to the advertisement telephone number, forwarding the fraud-detection telephone call to the target telephone number of the advertiser via the connection provider to establish a telephone connection between the control telephone number and the target telephone number, and tracking and storing fraud-detection telephone call information, including the advertisement telephone number, the control telephone number, the publisher reference, and the target telephone number, via a calling identification reporting system of the fraud monitor, of the telephone connection between the control telephone number and the target telephone number established via the fraud-detection call from the control telephone number of the fraud monitor to the advertisement telephone number included in the advertisement. In one embodiment, the method further includes entering a predetermined fraud-detection key press code via the fraud monitor during the fraud-detection telephone call to be included in the fraud-detection telephone call information, the fraud-detection key press code indicating a possible advertisement content violation. In another embodiment, the method further includes entering a predetermined policed advertising content identification key press code via the fraud monitor during the fraud-detection telephone call to be included in the fraud-detection telephone call information, the policed advertising content identification key press code identifying the policed advertising content of the policed advertising content monitoring. In yet another embodiment, the method further includes taking and storing a screen scrape of the advertisement via the fraud monitor. In still another embodiment, the method further includes compiling and sending an electronic message, including the screen scrape, the fraud-detection telephone call information, and a predetermined message identifying the screen scrape and the fraud-detection telephone call information as evidence of a possible fraudulent advertisement, via the fraud monitor to a predetermined recipient reference. The policed advertising content is misleading content, such as at least one of a brand, a trademark, a representation, and a guarantee.

In an advertisement in an electronic network, including an advertisement telephone number of a connection provider assigned to an advertiser of the advertisement, policed advertising content, and a publisher reference, published to a communications device via a publisher, to receive a telephone call at the connection provider via the advertisement telephone number, and the advertisement telephone number to replace a target telephone number of the advertiser within the advertisement, a system includes means for monitoring advertisements in the electronic network via a fraud monitor for the policed advertising content, means for retrieving the advertisement via the fraud monitor based on the policed advertising content monitoring, means for establishing a fraud-detection telephone call to the advertisement telephone number from a control telephone number via the fraud monitor, which causes the connection provider to forward the fraud-detection telephone call to the target telephone number of the advertiser to establish a telephone connection between the control telephone number and the target telephone number, and means for tracking and storing fraud-detection telephone call information, including the advertisement telephone number, the control telephone number, the publisher reference, and the target telephone number, via a calling identification reporting system of the fraud monitor, of the telephone connection between the control telephone number and the target telephone number 23 established via the fraud-detection call from the control telephone number of the fraud monitor to the advertisement telephone number included in the advertisement. In one embodiment, the system further includes means for entering a predetermined fraud-detection key press code via the fraud monitor during the fraud-detection telephone call to be included in the fraud-detection telephone call information, the fraud-detection key press code indicating a possible advertisement content violation. In another embodiment, the system further includes means for entering a predetermined policed advertising content identification key press code via the fraud monitor during the fraud-detection telephone call to be included in the fraud-detection telephone call information, the policed advertising content identification key press code identifying the policed advertising content of the policed advertising content monitoring. In yet another embodiment, the system further includes means for taking and storing a screen scrape of the advertisement via the fraud monitor. In still another embodiment, the system further includes means for compiling and sending an electronic message, including the screen scrape, the fraud-detection telephone call information, and a predetermined message identifying the screen scrape and the fraud-detection telephone call information as evidence of a possible fraudulent advertisement, via the fraud monitor to a predetermined recipient reference.

BRIEF DESCRIPTION OF THE DRAWINGS

Referring to the drawings:

FIG. 6 shows an example of fraud-detection telephone call information tracking report according to the principle of the invention;

FIG. 7 shows an example of an electronic message according to the principle of the invention.

DETAILED DESCRIPTION

Paid calling advertising, also known as pay-per-call advertising or cost-per-call advertising, is form of advertising wherein pay-per-call providers or networks drive telephone calls to advertisers via advertisements, including mobile advertisements, over an electronic network, e.g. the Internet, to their company representatives, or to their interactive voice response (IVR) systems. Advertisements for products and/or services are published, by pay-per-call providers or by publishers, to user networked appliances, such as mobile phones, and computers, such as tablet computers, laptop computers, and desktop computers, via pay-per-call campaigns. Consumers see the advertisements on their appliances. When the consumer calls the advertisement telephone number included in the advertisement, a phone call is generated and the consumer is then transferred via call forwarding to the advertiser. When the user appliance is a mobile phone and a consumer sees the advertisement on the mobile phone, the user may call the advertisement phone number via "clicking," such as by "clicking" on the advertisement phone number, the advertisement, or an object, such as a button, image, or text of the advertisement, and this is common and well-known. The use of publishers in pay-per-call advertising is commonplace because publishers can provide widespread advertisement distribution.

Figure 1:
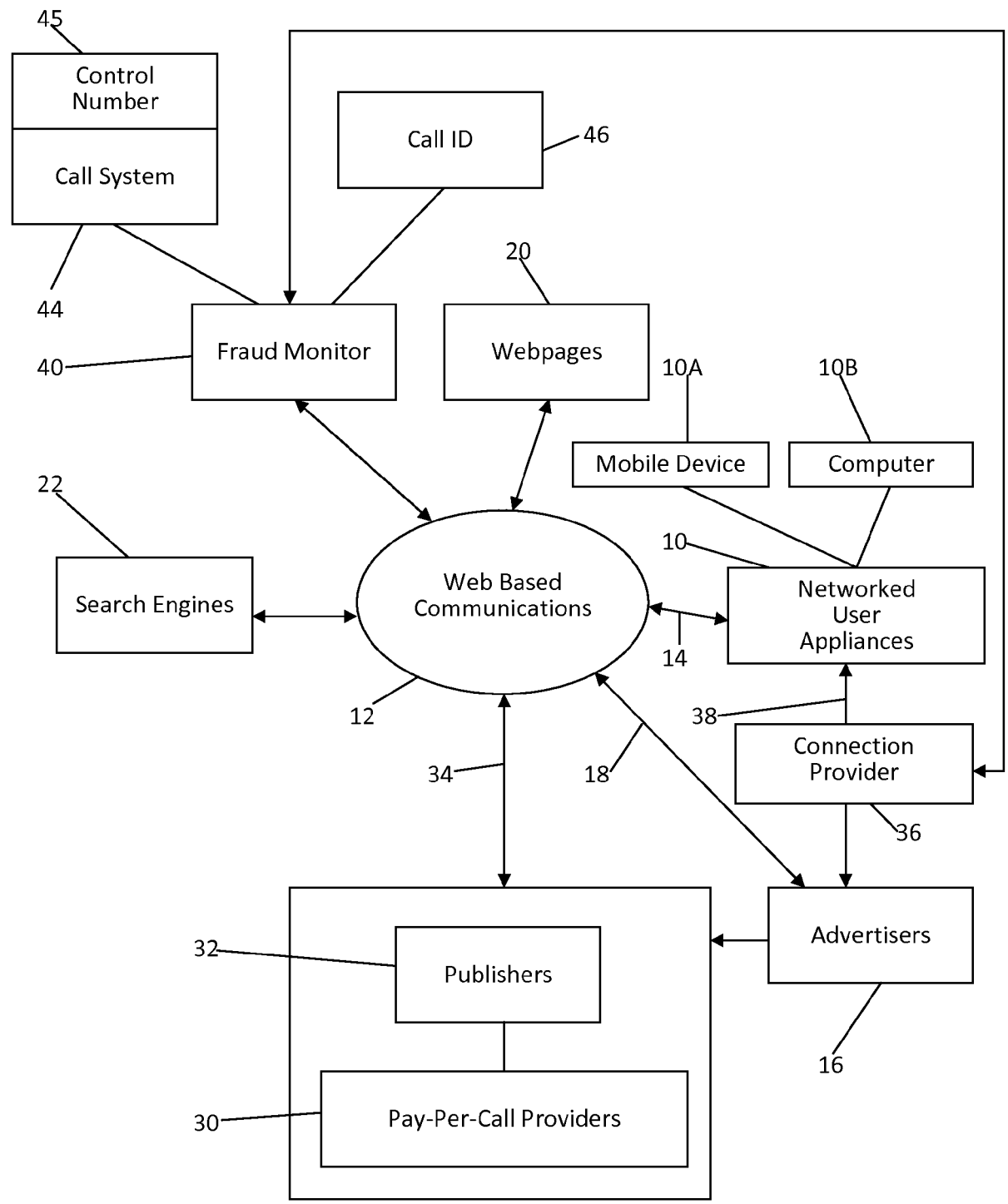
FIG. 1 shows an interaction between user appliances, advertisers, an electronic network, and a fraud monitor according to the principle of the invention.

With this framework in mind, FIG. 1 of the drawings shows how customers, via their user networked appliances 10, and advertisers interact with each other in a pay-per-call paradigm. Referring to FIG. 1, user appliances 10, such as mobile phones 10A, and computers 10B, such as tablet computers, laptop computers, and desktop computers, are coupled to wide area electronic network (WAN) 12, e.g. the Internet, via one or more communications paths, such as communications path 14. Advertisers 16 are coupled to electronic network 12 via one or more communications paths, such as communications path 18. Communications paths 14 and 18 are conventional and well-known and preferably support the TCP/IP protocols. Advertisers 16 may each have a webpage 20. A webpage 20 may be included in a website accessed from a user appliance 10, e.g. a social networking website, a news media website, etc., and the webpage 20 may be selected or viewed by a user via the user appliance 10 that accessed the website. A webpage 20 may also be included in a results page of a key word search initiated by a user of a user appliance 10, which search is, for example, performed by an online search engine 22. The webpage 20 of an advertiser 16 may be included within a results page compiled by the search engine 22 and sent via the communications path 14 to the user appliance 10 that initiated the search, so that the webpage 20 may be selected or viewed by a user of the user appliance 10 that requested the search. Pay-per-call providers 30 and publishers 32 are coupled to electronic network 12 via one or more communications paths, such as communications path 34. In pay-per-call-advertising, an advertiser 16 employs a pay-percall provider 30 to drive calls, via advertisements to user appliances 10, between user appliances 10 and target telephone numbers of company representatives of the advertiser 16, or to interactive voice response (IVR) systems of the advertiser 16. Pay-per-call providers 30 work with advertisers 16 to create advertisements. The advertisements are published, by the pay-per-call providers 16 or by publishers 32 that publish the advertisements via pay-per-call campaigns, to user appliances 10, such as in response to search requests initiated from user appliances of in response to websites or webpages accessed from user appliances 10, such as social network websites/webpages, news media websites/webpages, etc. Consumers see the advertisements on their user appliances 10.

Figure 2:
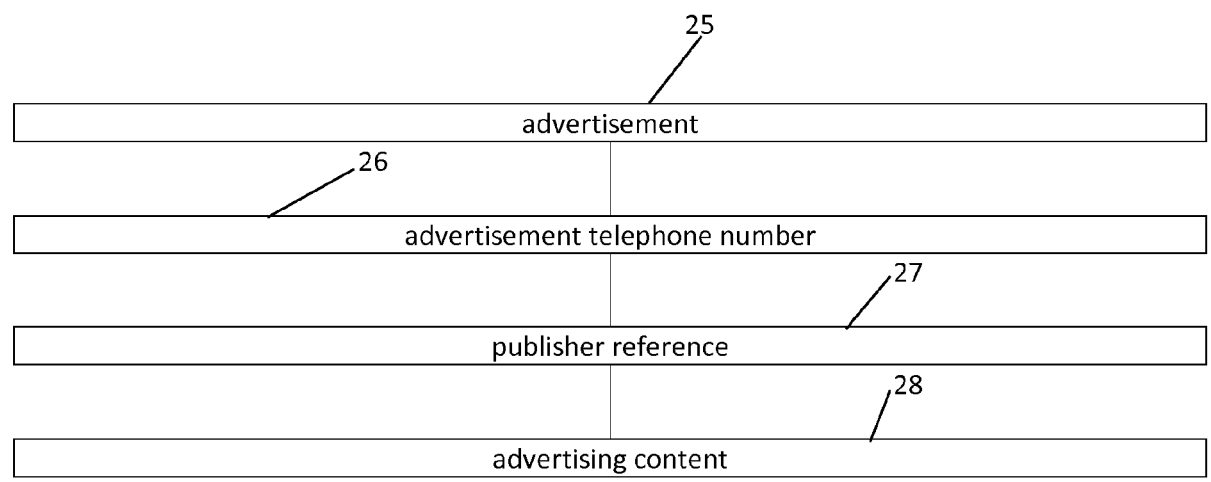
FIG. 2 shows elements of an advertisement.

Advertisements 25 published to user appliances 10 include certain content as represented in FIG. 2, including advertisement telephone numbers 26 of a connection provider 36 referenced in FIG. 1, a publisher reference 27 and, as is often the case, advertising content 28 of an advertiser. The advertising content 28 is designed to draw good attention toward a product or a service or both in order to cause a customer to call the advertisement telephone number 26 of the advertisement 25 for product and/or service purchasing purposes. The advertising content 28 relates to a particular advertiser 16, and will often include such customer-luring content as a brand or a trademark, a tag line, a representation, such as a guarantee, product and/or service information, or the like, that consumers see on their user appliances 10 so as to draw the consumers to the advertised products and/or services. The advertisement telephone numbers 26 replace target telephone number of the advertiser 16 within the advertisements 25, and this is well-known. The publisher reference 27 is a code that identifies the publisher 32 of the advertisement 25, and this is also well-known and required in conventional pay-per-call models. The publisher reference 27, which is typically a numerical or alphanumerical code, is embedded content that consumers do not see on their phones. The advertisement telephone numbers 26 are assigned/linked to the advertisers 16. The advertisement telephone numbers 26 are used to establish telephone calls between user appliances 10 and target telephone numbers of target telephones of the advertisers 16 via one or more communications paths, such as communications path 38. Communications path 38 is provided by a conventional telephone network, and connection provider 36 is a telephone company that provides telecommunications services over communications path 38. When the consumer calls an advertisement telephone number 26 assigned/linked to an advertiser 16 of an advertisement, such as via a "click" or "clicking," a telephone call is established at a connection provider 36 from a user appliance 10 or other selected telephone or telephonic appliance, which is forwarded via call forwarding of the connection provider 36 to a target telephone number of an advertiser 16 to establish a telephone connection between the user appliance 10 telephone number and the target telephone number of the advertiser 16. This pay-per-call advertising paradigm is all well-known in the art and does not comprise part of the invention.

Of course the purpose of pay-per-call advertising is for an advertiser to seek or generate increased consumption of its products or services through advertising content 28 in pay-per-call advertisements presented to user appliances 10 via pay-per-call campaigns. The advertising content 28 relates to a particular advertiser 16 and draws good attention or perhaps bad attention toward a product and/or a service depending on customer experiences. If the advertising content 28 draws good attention of a particular customer, such a customer may be lured in to call the advertisement telephone number 26 of the advertisement 25. Conversely, if the advertising content 28 draws bad attention of a particular customer, such a customer will be lured away from calling the advertisement telephone number 26 of the advertisement 25.

And so publishers generate their revenue through call generation via advertisements they publish through pay-per-call campaigns. As discussed above, rogue publishers and even some unscrupulous advertisers often will employ dishonest techniques to generate "click-through" calls in order to generate publisher revenue and to harvest customers from other legitimate advertisers. A "click-through" call is a call generated from an advertisement that goes to a different advertiser from the one the caller intended to call. To generate a "click-through" call, the advertisement incorporates misleading advertising content designed to mislead a consumer into thinking that the advertisement relates to a particular advertiser, such as Advertiser A, when it actually relates to a different advertiser, such as Advertiser B. When a call is made from such an advertisement, the call goes not the advertiser the caller believed he/she was calling, Advertiser A, but to a different advertiser, Advertiser B. However, when a call is made from such an advertisement, the call goes not to the advertiser the caller believed he/she was calling, Advertiser A, but to a different advertiser, Advertiser B, which generates dishonestly-obtained revenue for the rogue publisher and provides Advertiser B the calling party reaches with the opportunity to harvest business away from Advertiser A the calling party thought he/she was calling. Some business that participate in pay-per-call campaigns are generic pay-per-call advertisers that use generic advertisements that do not incorporate advertising content specific to that advertiser, which still does not prevent rogue publishers and/or advertisers from using advertising content of the generic pay-per-call advertiser. Furthermore, some non-participating businesses don't even participate in pay-per-call advertising, which still does not prevent rogue publishers and/or advertisers from using advertising content of non-participating businesses According then to the principle of the invention, disclosed herein are systems and methods for monitoring/surveilling advertisements in an electronic network for misleading or misdirecting advertisement content, and for tracking down the publishers and advertisers of fraudulent advertisements that incorporate misleading or misdirecting advertisement content designed to lure customers away from legitimate advertisers so that action may be taken to take down the misleading or misdirecting advertisements.

Figure 3:
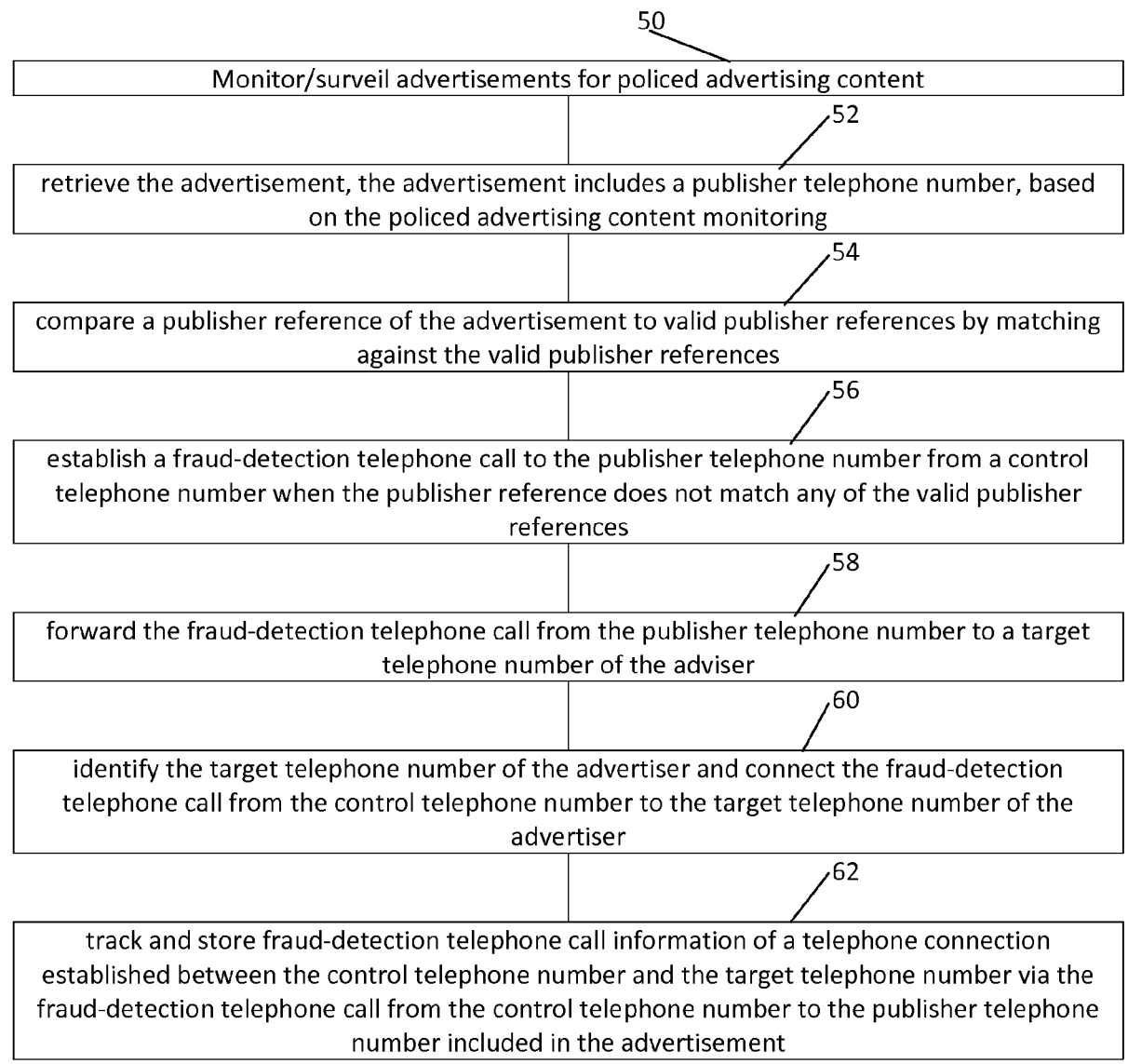
FIGS. 3 and 4 are flowcharts of fraud-detection operations performed in accordance with the principle of the invention.

FIG. 3 of the drawings is a flowchart of fraud-detection operations of a fraud-detecting, fraud-monitoring, or fraud-surveillance method performed in accordance with the principle of the invention. The fraud-detection operations or method steps are performed via fraud monitor 40 referenced in FIG. 1 for the purpose of identifying and documenting misleading or misdirecting advertisements. Fraud monitor 40 is coupled to electronic network 12 via one or more communications paths, such as communications path 42. Communications path 42 may support the TCP/IP protocols.

Looking to FIG. 3 in conjunction in relevant part with FIGS. 1 and 2, at block 50 the fraud monitor 40 monitors/surveils advertisements 16 in electronic network 12 in for policed advertising content 28, which is defined as the advertising content 28, as that term is defined above, of a policing advertiser 16 that does not want other advertisers 16 to use in pay-per-call advertisements. As a product of this monitoring/surveilling carried out at block 50, at block 52 the fraud monitor 40 finds and retrieves a suspect advertisement 25 based on the policed advertising content monitoring/surveilling. The question now is whether the found and retrieved advertisement 25, which is a suspect advertisement 25, is authorized to use the policed advertising content it contains. And so at block 54 the fraud monitor 40 compares a publisher reference 27 of the suspect advertisement 25 to one or more valid publisher references authorized to use the policed advertising content 28 of the advertisement 25 in pay-per-call advertising by matching against one or more valid publisher references. At block 56 the fraud monitor 40 establishes a fraud-detection telephone call to the advertisement telephone number 26 of the suspect advertisement 25 from a control telephone number 45 assigned/linked to the fraud monitor 40 via a call system 44 of the fraud monitor 40 when the publisher reference 27 included in the suspect advertisement 25 does not match any of the one or more valid publisher references. When the publisher reference 27 of the suspect advertisement 25 is determined not to match any of the one or more valid publisher references, this is a triggering event, whereby fraud monitor 40 is responsive and establishes a fraud-detection telephone call to the advertisement telephone number 26 of the suspect advertisement 25 from a control telephone number 45 assigned/linked to the fraud monitor 40 via a call system 44 of the fraud monitor 40. Call system 44 is a computerized telephony intelligent network featuring, among other things, automatic number identification (ANI) and automatic key press functionality. In response to the fraud-detection telephone call from the control telephone number 45 of the fraud monitor 40 to the advertisement telephone number 26 of the suspect advertisement 25, at block 58 the connection provider 36 forwards via call forwarding the fraud-detection telephone 22 call to the target telephone number of the advertiser 16 of the suspect advertisement 25 to establish a telephone connection between the control telephone number of the fraud monitor 40 and the target telephone number of the advertiser.

Whether the suspect advertisement 25 is authorized to use the policed advertising content it contains is moot if there is no authorized use of the policed content. In this embodiment, the comparing step at block 54 may be omitted and the method may proceed to block 56 where the fraud monitor 40 establishes a fraud-detection telephone call to the advertisement telephone number 26 of the suspect advertisement 25 from a control telephone number 45 assigned/linked to the fraud monitor 40 via a call system 44 of the fraud monitor 40, in accordance with the principle of the invention.

To forward the fraud-detection telephone call, as a matter of an example of a typical and well-known call-forwarding process, at block 60 the connection provider 36 identifies the target telephone number of the advertiser 16 of the suspect advertisement 25 and connects the fraud-detection telephone call from the control telephone number of the fraud monitor 40 to the target telephone number of the advertiser 16 of the suspect advertisement.

At block 62 the fraud monitor 40 tracks and stores via a calling identification and reporting system 46 of the call system 44 of the fraud monitor 40 the fraud-detection telephone call information, including the advertisement telephone number 26 of the suspect advertisement 25, the control telephone number of the fraud monitor 40, the publisher reference 27 identifying the publisher 32 of the suspect advertisement 25, and the target telephone number of the advertiser, of the telephone connection between the control telephone number of the fraud monitor 40 and the target telephone number of the advertiser 16 of the suspect advertisement 25 established via the fraud-detection call from the control telephone number of the fraud monitor 40 to the advertisement telephone number 25 included in the suspect advertisement 25. The fraud-detection telephone call information generated in response to the method step of block 56 is stored in calling identification reporting of the fraud monitor 40, which is useful documentation in that it identifies the suspect advertisement 25, the publisher of the suspect advertisement 25, and the advertiser relating to the suspect advertisement 25. This information is useful by a policing advertiser 16 for taking action to take down the misleading or misdirecting advertisement which, in this example, is suspect advertisement 25.

Figure 4:
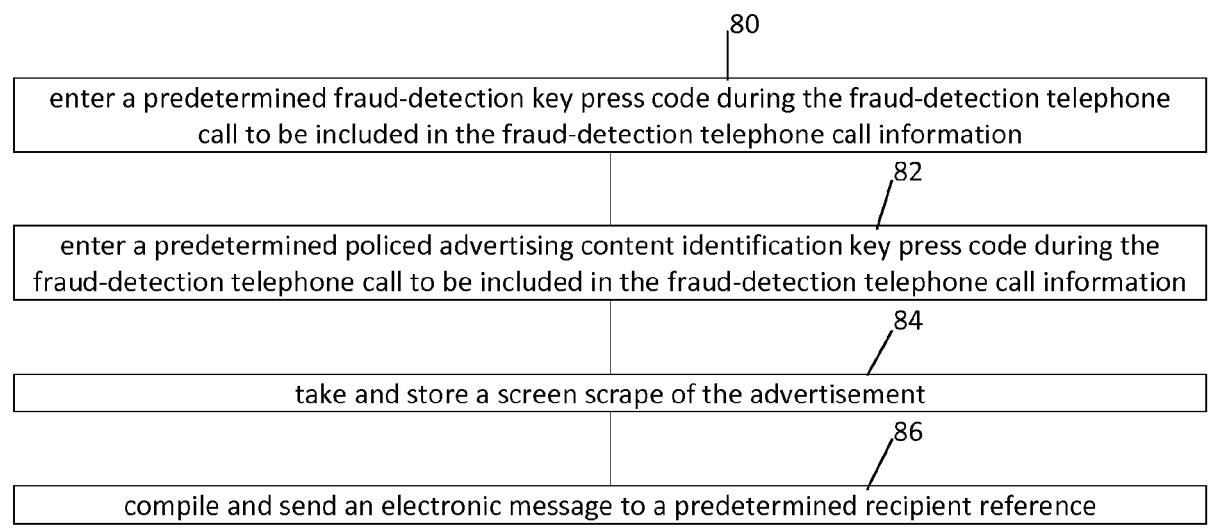

FIG. 4 of the drawings is a flowchart of additional fraud-detection operations performed in accordance with the principle of the invention. Looking to FIG. 4 in conjunction in relevant part with FIGS. 1 and 2, at block 80 the fraud monitor 40 enters a predetermined fraud-detection key press code via the call system 44 during the fraud-detection telephone call to be included in the fraud-detection telephone call information. The fraud-detection key press code included in the fraud-detection telephone call information flags the fraud-detection telephone call information for indicating a possible policed advertising content infringement violation by the suspect advertisement 25. At block 82 the fraud monitor 40 enters a predetermined policed advertising content identification key press code via the call system 44 during the fraud-detection telephone call to be included in the fraud-detection telephone call information. The policed advertising content identification key press code included in the fraud-detection telephone call information is an assigned code that identifies, or that is otherwise linked to, the policed advertising content 28. At block 84 the fraud monitor 40 takes and stores a screen scrape of the suspect advertisement. At block 86, the fraud monitor 40 compiles and sends an electronic message, including the screen scrape, the fraud-detection telephone call information, and a predetermined message identifying the screen scrape and the fraud-detection telephone call information as evidence of a possible policed advertising content 28 infringement violation, to a predetermined recipient reference assigned/linked to the policed advertising content 28 and/or to the policed advertising content key press code for notifying a predetermined recipient of a possible policed advertising content infringement violation. In one embodiment, the electronic message is an email and the predetermined recipient reference is a predetermined email address of a predetermined recipient. In another embodiment, the electronic message is an XML message and the predetermined recipient reference is a predetermined XML destination address of a software application recipient. Other forms of electronic messages can be used commensurate with nature and scope of the invention as herein specifically described.

Figure 5:
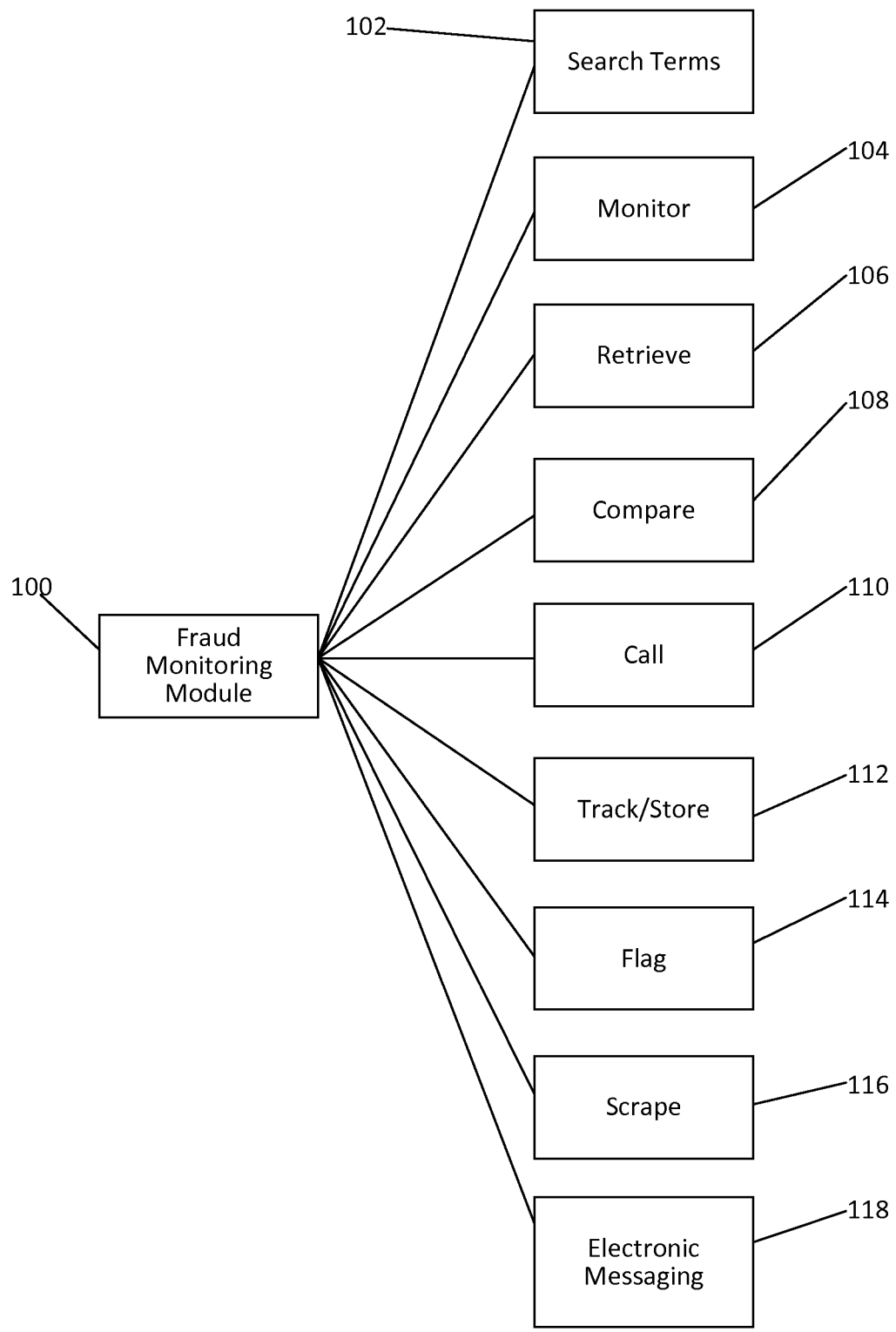
FIG. 5 illustrates a fraud monitoring module according to the principle of the invention.

FIG. 5 of the drawings shows a functional description of a system of fraud monitor 40 to implement the method of FIGS. 3 and 4. Referring to FIG. 5, the system includes a fraud monitoring or surveillance module 100. Module 100 includes text generation logic 102. The purpose of text generation logic 102 is to allow a user of fraud monitor 40 to input content that is maintained in memory/storage of the fraud monitor 40. This content includes policed advertising content 28, such brand or trademark search terms, keywords, tag lines, representations, guarantees, symbols, or the like, of a policing advertiser, to be monitored for fraud detection purposes. Text generation logic 102 also allows a user to input valid publisher references authorized to use corresponding policed advertising content 28, to input predetermined fraud-detection key press codes, to input predetermined policed advertising content identification key press codes and to assign such codes to predetermined policed advertising content 28 to be monitored/surveilled for fraud-detection purposes in accordance with the principle of the invention. Again, all of this content input via text generation lock 102 is maintained in memory/storage of the fraud monitor 40.

Monitor or surveillance logic 104 monitors or surveils electronic network 12 advertisements 25 for policed advertising content 28, and retrieve logic 106 retrieves advertisements 25 found on electronic network 12 via monitoring/surveillance that are found to include the policed advertising content 28, in accordance with the principle of the invention. Retrieved advertisements 25 are, of course, considered suspect advertisements 25. Compare logic 108 compares a publisher reference 27 of the suspect advertisement 25 to the one or more valid publisher references authorized to use the policed advertising content 28 in pay-per-call advertising by matching against the one or more valid publisher references. Again, the one or more valid publisher references identify those one or more publishers, if any, that are authorized to use the designated policed advertising content 28. Call logic 110 establishes a fraud-detection telephone call to the advertisement telephone number 26 of the suspect advertisement 25 from a control telephone number 45 assigned/linked to the fraud monitor 40 via call system 44 of the fraud monitor 40 when the publisher reference 27 included in the suspect advertisement 25 does not match any of the valid publisher references as determined by compare logic 108, in accordance with the principle of the invention. Again, when the publisher reference 27 of the suspect advertisement 25 is determined not to match any of the one or more valid publisher references via compare logic 108, this is a triggering event, whereby call logic 100 is responsive so as to establish a fraud-detection telephone call to the advertisement telephone number 26 of the suspect advertisement 25 from a control telephone number 45 assigned/linked to the fraud monitor 40 via call system 44. After the fraud-detection telephone call is established between the control telephone number 45 of the fraud monitor 40 and the target telephone number of the advertiser 16 of the suspect advertisement 25, track/store logic 112 tracks and stores the fraud-detection telephone call information, including the advertisement telephone number 26 of the suspect advertisement 25, the control telephone number 45 of the fraud monitor 40, the publisher reference 27 identifying the publisher 32 of the suspect advertisement 25, and the target telephone number, of the telephone connection between the control telephone number 45 of the fraud monitor 40 and the target telephone number of the advertiser 16 of the suspect advertisement 25 established via the fraud-detection call from the control telephone number 45 of the fraud monitor 40 to the advertisement telephone number 25 included in the suspect advertisement 25. The tracked and stored fraud-detection telephone call information is stored via track/store logic 112 in a call report, which is useful for documenting the call information related to the suspect advertisement 25 so as to document and identify the suspect advertisement 25. An example of such a call report is shown in FIG. 6 of the drawings and is marked as reference numeral 140.

Again, whether the suspect advertisement 25 is authorized to use the policed advertising content it contains is moot if there is no authorized use of the policed content. In this embodiment, the comparing step performed by compare logic 108 may be omitted and the method may proceed to establishing the fraud-detection telephone call via call logic 110.

During the fraud-detection telephone call, such as within one second, two seconds in an alternate embodiment, or other brief predetermined period of time after the fraud-detection telephone call is established as a matter of example, such brief predetermined period of time not to exceed five seconds after the establishment of the fraud-detection telephone call, flag logic 114 accesses the predetermined fraud-detection key press code from the memory/storage of fraud monitor 40 and enters the predetermined fraud-detection key press code via the call system 44 to be included in the fraud-detection telephone call information. Again, the inclusion of the predetermined fraud-detection key press code in the fraud-detection telephone call information flags the fraud-detection telephone call information as relating to the suspect advertisement 25, namely, an advertisement with the policed advertising content 28. Flag logic 114 also accesses the predetermined policed advertising content identification key press code from the memory/storage of fraud monitor 40 and enters the predetermined policed advertising content identification key press code via the call system 44 to be included in the fraud-detection telephone call information. Again, the inclusion of the predetermined policed advertising content identification key press code identifies the policed advertising content 28 of the suspect advertisement 25. Scrape logic 116 takes and stores in the memory/storage of fraud monitor 40 a screen scrape of the suspect advertisement 25 so as to further document the suspect advertisement 25. Screen-scraping is well-known by those skilled in the art, further details of which will therefore not be discussed in further detail. After all these processes are taken, electronic messaging logic 118 accesses the predetermined recipient reference from the memory/storage of fraud monitor 40 that is assigned/linked to the policed advertising content 28 and or the corresponding policed advertising content identification code and automatically compiles and sends an electronic message or electronic message alert, including the screen scrape, the fraud-detection telephone call information, and a predetermined message identifying the screen scrape and the fraud-detection telephone call information as evidence of a possible policed advertising content infringement violation, to a predetermined recipient reference assigned/linked to a predetermined recipient for notifying the predetermined recipient of a possible policed advertising content 28 infringement violation, which, according to this disclosure, is the unauthorized use of the policed advertising content, in accordance with the principle of the invention. An example of such an electronic message in the form of an email in one embodiment is shown in FIG. 7 of the drawings and is marked as reference numeral 170.

Attention is now directed to call report 140 in FIG. 6. Call report 140 represents the call reporting of fraud-detection telephone calls made from the control telephone number 45. The fraud-detection telephone call information in call report 140 includes that of just one fraud-detection telephone call that documents a suspect advertisement 25, and this is shown merely by way of example with the understanding that such a call report may include the call information of other tracked/stored telephone calls, including fraud-detection telephone call information of other fraud detection telephone calls.

The information in call report 140 of the fraud-detection telephone call related to the suspect advertisement 25 includes an advertiser reference 142, a publisher reference 144, the calling or control telephone number 45, the advertisement telephone number 146, and the target phone number 148. Additional information in the call reporting may include the pay-per-call provider reference 150 identifying the corresponding pay-per-call provider or affiliate, a pay-per-call advertising reference 152 identifying the type of pay-per-call campaign, a media type reference 154 indicating the type of advertisement promotion, one or more fee references 156 indicating earned and commissioned fees, if any, related to the fraud-detection telephone call, a location reference 158 indicating the city and state of target telephone number 148, and, as a matter of example, a call duration reference 160 indicating the duration of the fraud-detection telephone call.

Also included in call report are key press references according to the principle of the invention, including a flag key press reference and a policed advertising content identification key press reference. The flag key press reference is the predetermined fraud-detection key press code 162 entered via the call system 44 that flags the fraud-detection information as relating to the suspect advertisement 25, and this identifies or flags the advertisement 25 as a suspect advertisement 25. The policed advertising content identification key press reference includes the predetermined policed advertisement content identification key press code 164 that identifies the policed advertising content that was monitored/surveilled that resulted in the retrieval of the suspect advertisement 25 via the policed advertising content monitoring/surveilling processes carried out in accordance with the principle of the invention. Other information regarding a fraud-detection telephone call can be included in call report if so desired.

In this example, fraud-detection key press code 162 is a numerical code. Code 162 is a four digit numerical code 9999 in this example. Code 162 can have more than four digits or less than four digits, and can be composed of words, letters, symbols, and/or numbers assigned to communicate a message or a meaning, namely, the indication of fraudulent call information.

In this example, the policed advertising content identification key press code 164 is a predetermined numerical code. Code 164 is a four digit numerical code 1234 in this example. Code 164 can have more than four digits or less than four digits, and can be composed of words, letters, symbols, and/or numbers assigned to communicate a message or a meaning, namely, the indication of monitored/surveilled policed advertising content. Each policed advertising content identification key press code 164 is preferably assigned/linked to one or more recipient references to be sent an electronic message at block 86. The one more recipient references each correspond to a lawyer, a law firm, a pay-per-call provider, an advertiser, a publisher, or other party or designated recipient.

Figure 8:
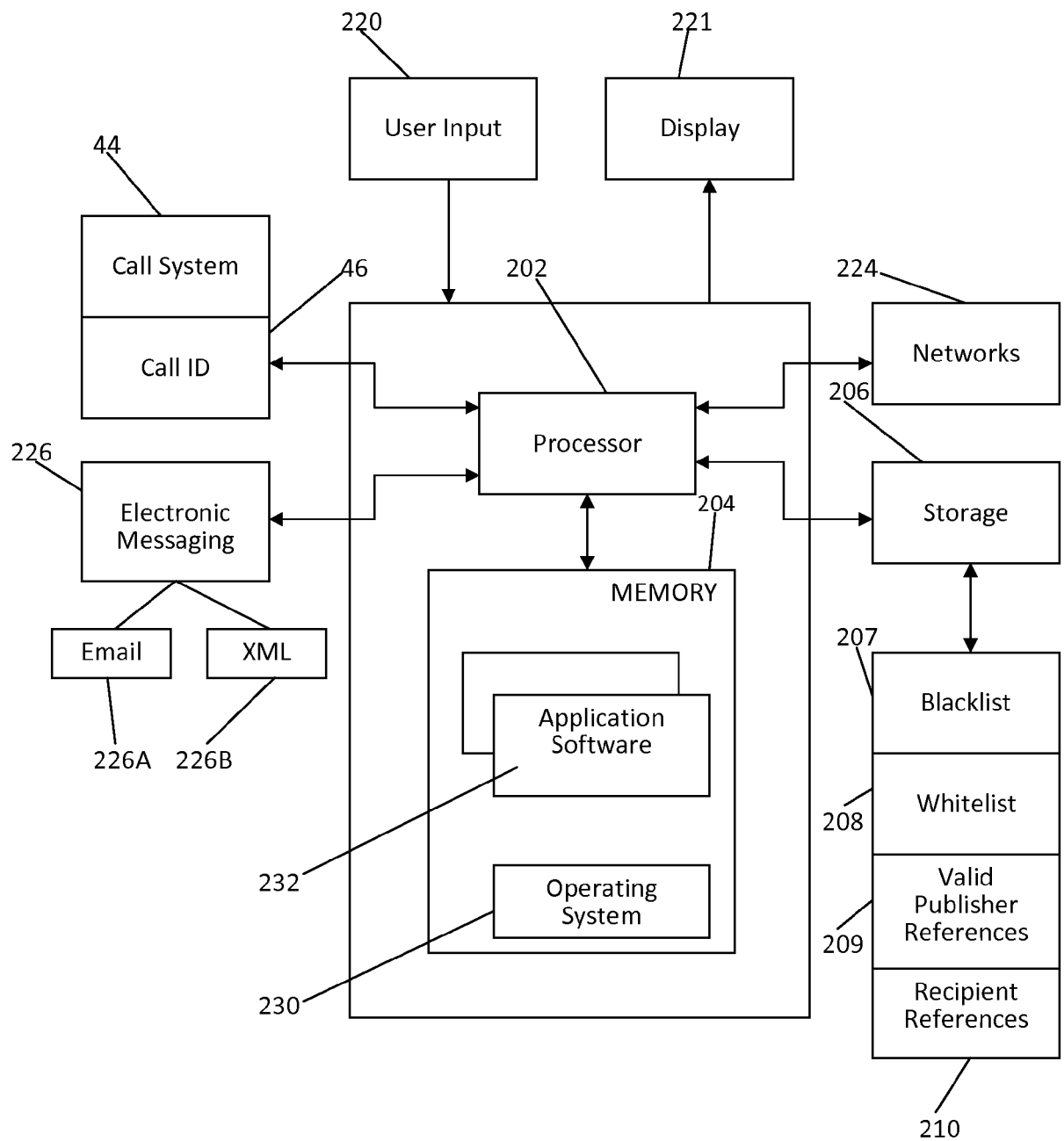
FIG. 8 shows a high level hardware block diagram of a call and data processing system for implementing fraud-detection operations.

Referring to FIG. 8 of the drawings, reference numeral 200 generally indicates hardware that may be used to execute/implement the above-described methods/system and functional logic in FIG. 5 of module 100 of fraud monitor 40 according the above-described methods and the functions of the logic presented in FIG. 5. The hardware 200 and the functional logic of module 100 constitute fraud monitor 40. The hardware 200, which is a call and data processing system that that executes/implements the above-described methods/system and functional logic in FIG. 5 of module 100 of fraud monitor 40 according the above-described methods and the functions of the logic presented in FIG. 5, typically includes at least one processor 202 coupled to a storage or memory 204. The processor 202 may represent one or more processors (e.g., microprocessors), and the memory 204 may represent random access memory (RAM) devices comprising a main storage of the hardware 200, as well as any supplemental levels of memory e.g., cache memories, non-volatile or back-up memories (e.g. programmable or flash memories), read-only memories, etc. In addition, the memory 204 may be considered to include memory storage physically located elsewhere in the hardware 200, e.g. any cache memory in the processor 202, as well as any storage capacity used as a virtual memory, e.g., as stored on a mass storage or memory device, such as storage or memory 206.

In this example, memory 206 maintains fraud detection key press code 162 accessed by processor 202, but it may be maintained elsewhere, such as at storage 204. Memory 206 maintains a database including a blacklist 207 of policed advertising content 28, a whitelist 208 of one or more valid publisher references 209, if any, used by compare logic 108, when applicable, implemented via processor 202 and one or more recipient references 210 used by electronic messaging logic 118 implemented via electronic messaging server 226, which may be email server 226A to compile and send emails to predetermined email addresses comprising the recipient references 210, or, as matter of example, XML generator or server 226B to compile and send XML messages and payload denoted at 140 and 170 in FIGS. 6 and 7, respectively, to predetermined XML destination addresses comprising the recipient references 210.

In the database maintained by storage 206 each policed advertising content identification key press code 164 is assigned/linked to a corresponding policed advertising content 28, and each policed advertising content 28 and each policed advertising content identification key press code 164 is assigned/linked to one or more recipient references 210 to be sent electronic messages or electronic message alerts at block 86. For additional storage, the hardware 200 may also include one or more additional mass storage devices, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Processor 202 is coupled to call system 44 implemented via logic 110, to calling identification and reporting system 46 implemented via logic 112, and to electronic messaging server implemented via electronic messaging logic 118 to compile and send electronic messages to designated recipient references 210. Monitor logic 104, retrieve logic 106, compare logic 108, flag logic 114 and scrape logic 116 are implemented/executed via processor 202.

The hardware 200 also typically receives a number of inputs and outputs for communicating information externally. For interface with a user or operator, the hardware 200 may include one or more user input devices 220 (e.g., a keyboard, a mouse, etc.) and a display 221 (e.g., a Cathode Ray Tube (CRT) monitor, a Liquid Crystal Display (LCD) panel). These input and output devices allow a user to input content, via text generation logic 102, that is maintained in memory/storage of the fraud monitor 40. Furthermore, the hardware 200 may include an interface with one or more networks 224 (e.g., a local area network (LAN), a wide area network (WAN), a wireless network, and/or the 2 Internet among others) to permit the communication of 3 information with other computers coupled to the networks. 4 It should be appreciated that the hardware 200 typically 5 includes suitable analog and/or digital interfaces between 6 the processor 202 and each of the components 204, 206, and 224 as is well known in the art.

The hardware 200 operates under the control of an operating system 230, and executes the logics of module 100 via various computer software applications 232, components, programs, objects, module 100, etc. (e.g. a program or module which performs operations described above). Moreover, various applications, components, programs, objects, etc. may also execute on one or more processors in another computer coupled to the hardware 200 via network 224, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The invention has been described above with reference to preferred embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A combined electronic pay-per-call network and electronic pay-per-call electronic advertisement policing system, comprising:
    a hardware processor coupled to a) an electronic network where pay-per-call electronic advertisements, each including an advertisement telephone number and a publisher reference, are published, (b) a hardware computerized telephony intelligent network (CTIN) assigned to a control telephone number and configured to use the control telephone number to establish control telephone calls to the advertisement telephone numbers, and (c) a memory maintaining a valid publisher reference; and
    the memory further comprising non-transitory computer-readable storage media having stored thereon executable instructions that when executed by the hardware processor cause the hardware processor to effectuate operations comprising the hardware processor comparing a publisher reference of a pay-per-call electronic advertisement published in the electronic network to the valid publisher reference and, when the publisher reference does not match the valid publisher reference, establishing, by the CTIN, a control telephone call from the control telephone number to an advertisement telephone number of the pay-per-call electronic advertisement.

2. The combined electronic pay-per-call network and electronic pay-per-call electronic advertisement policing system according to claim 1, additionally comprising:
    a hardware calling identification and reporting system (CIRS);
    a connection provider forwards the control telephone call to a target telephone number establishing a telephone connection connecting the control telephone number to the target telephone number; and
    the operations additionally comprise storing, by the CIRS, telephone call information of the telephone connection.

3. An electronic pay-per-call electronic advertisement policing method, comprising:
    coupling a hardware processor to a) an electronic network where pay-per-call electronic advertisements, each including an advertisement telephone number and a publisher reference, are published, b) a hardware computerized telephony intelligent network (CTIN) assigned to a control telephone number and configured to use the control telephone number to establish control telephone calls to the advertisement telephone numbers, and c) a memory maintaining a valid publisher reference, the memory further comprising non-transitory computer-readable storage media having stored thereon executable instructions that when executed by the hardware processor cause the hardware processor to effectuate operations; and
    executing, by the hardware processor, the instructions effectuating the operations comprising the hardware processor comparing a publisher reference of a pay-per-call electronic advertisement published in the electronic network to the valid publisher reference and, when the publisher reference does not match the valid publisher reference, establishing, by the CTIN, a control telephone call from the control telephone number to an advertisement telephone number of the pay-per-call electronic advertisement.

4. The method according to claim 3, additionally comprising a hardware calling identification and reporting system (CIRS), the method additionally comprising a connection provider forwarding the control telephone call to a target telephone number establishing a telephone connection connecting the control telephone number to the target telephone number, and the operations further comprising storing, by the CIRS, telephone call information of the telephone connection.

5. A combined electronic pay-per-call network and electronic pay-per-call electronic advertisement policing system, comprising:
    a hardware processor coupled to a) an electronic network where pay-per-call electronic advertisements, each including an advertisement telephone number and a publisher reference, are published, b) a hardware computerized telephony intelligent network (CTIN) assigned to a control telephone number and configured to use the control telephone number to establish control telephone calls to the advertisement telephone numbers, c) a hardware calling identification and reporting system (CIRS), and d) a memory maintaining a valid publisher reference; and the memory further comprising non-transitory computer-readable storage media having stored thereon executable instructions that when executed by the hardware processor cause the hardware processor to effectuate operations comprising the hardware processor comparing a publisher reference of a pay-per-call electronic advertisement published in the electronic network to the valid publisher reference and, when the publisher reference does not match the valid publisher reference, establishing, by the CTIN, a control telephone call from the control telephone number to an advertisement telephone number of the pay-per-call electronic advertisement, wherein a connection provider forwards the control telephone call to a target telephone number to establish a telephone connection connecting the control telephone number to the target telephone number, and storing, by the CIRS, telephone call information of the telephone connection.

* * * * *